United States Patent
Huang et al.

(10) Patent No.: US 10,114,427 B2
(45) Date of Patent: Oct. 30, 2018

(54) INPUT/OUTPUT MODULE BAFFLE AND MOTHERBOARD WITH THE SAME

(71) Applicant: ASUSTeK COMPUTER INC., Taipei (TW)

(72) Inventors: Yao-Hsun Huang, Taipei (TW); Yu-Chen Lee, Taipei (TW); Shu-Fen Huang, Taipei (TW); I-Cheng Yeh, Taipei (TW); Jonathan Chu, Taipei (TW); Ming-Hung Chung, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 15/481,451

(22) Filed: Apr. 6, 2017

(65) Prior Publication Data

US 2017/0332504 A1   Nov. 16, 2017

Related U.S. Application Data

(60) Provisional application No. 62/336,746, filed on May 16, 2016.

(30) Foreign Application Priority Data

Sep. 14, 2016   (TW) .............................. 105129997 A

(51) Int. Cl.
*H05K 7/14*   (2006.01)
*G06F 1/20*   (2006.01)
(Continued)

(52) U.S. Cl.
CPC .................................. *G06F 1/185* (2013.01)

(58) Field of Classification Search
CPC . G06F 1/181; G06F 1/20; G06F 1/183; G06F 1/184; G06F 1/16; H05K 7/20727;
(Continued)

(56) References Cited

U.S. PATENT DOCUMENTS

| 5,822,182 A | 10/1998 | Scholder et al. |
| 2005/0157454 A1* | 7/2005 | Peng ...................... G06F 1/181 |
| | | 361/679.4 |

(Continued)

FOREIGN PATENT DOCUMENTS

| CN | 201674028 U | 12/2010 |
| CN | 201876781 U | 6/2011 |
| TW | 201109897 A1 | 3/2011 |

*Primary Examiner* — James Wu
*Assistant Examiner* — Michael Matey
(74) *Attorney, Agent, or Firm* — CKC & Partners Co., Ltd.

(57) ABSTRACT

An input/output module baffle is adapted to an electronic device. The electronic device includes a motherboard and a casing. The motherboard is located inside the casing and includes a connector module. The input/output module baffle includes a fixing plate, a conductive component and a frame. The fixing plate includes a plurality of retaining clips to clamp the fixing plate on the connector module. The conductive component is located between the fixing plate and the connector module. The frame is located between the fixing plate and the casing. Moreover, a motherboard with the input/output module baffle is also disclosed herein.

6 Claims, 3 Drawing Sheets

(51) Int. Cl.
*H05K 1/02* (2006.01)
*H05K 7/20* (2006.01)
*G06F 1/18* (2006.01)

(58) Field of Classification Search
CPC .. H05K 5/03; H05K 7/1427; H05K 2201/044; H05K 7/20418; H05K 7/20818
See application file for complete search history.

(56) References Cited

U.S. PATENT DOCUMENTS

| | | | | |
|---|---|---|---|---|
| 2008/0253076 | A1* | 10/2008 | Chen | G06F 1/186 |
| | | | | 361/679.31 |
| 2011/0058324 | A1 | 3/2011 | Huang et al. | |
| 2014/0160683 | A1* | 6/2014 | Snider | H04B 1/082 |
| | | | | 361/709 |
| 2014/0337866 | A1* | 11/2014 | Lai | G06F 1/18 |
| | | | | 720/646 |
| 2015/0017080 | A1* | 1/2015 | Lingvall | B01J 19/249 |
| | | | | 422/631 |
| 2017/0235347 | A1* | 8/2017 | Heyd | G06F 1/185 |
| | | | | 361/679.31 |
| 2017/0268789 | A1* | 9/2017 | Liu | F24F 1/0059 |

* cited by examiner

INPUT/OUTPUT MODULE BAFFLE AND MOTHERBOARD WITH THE SAME

CROSS-REFERENCE TO RELATED APPLICATION

This application claims the priority benefit of U.S. provisional application Ser. No. 62/336,746, filed on May 16, 2016 and TW application serial No. 105129997, filed on Sep. 14, 2016. The entirety of the above-mentioned patent applications are hereby incorporated by references herein and made a part of specification.

BACKGROUND OF THE INVENTION

Field of the Invention

The invention relates to a motherboard.

Description of the Related Art

Conventionally, in assembling a personal computer, such as a desktop, various computer components, such as a motherboard and hard disks, are assembled in a casing. The computer components are connected to the motherboard and a power supply, respectively. Then, input/output ports are configured on the motherboard for connecting peripheral devices.

In the configuration of the desktop, most of the input/output ports are at the back of the casing. And then the peripheral device is connected to the input/output ports back at the casing. Moreover, an input/output port baffle needs to be installed on the casing. And the input/output ports of the motherboard match the openings of the input/output port baffle. Then, the motherboard is fixed on the casing.

However, when the input/output port baffle is assembled on the back of the casing, users are easily injured accidentally due to the sharp metal edges of the baffle. As a result, it is time consuming in assembly.

BRIEF SUMMARY OF THE INVENTION

According to an aspect of the disclosure, an input/output module baffle is provided. The input/output module baffle is adapted to an electronic device with a motherboard and a casing. The motherboard is located inside the casing, and the motherboard includes a connector module. The input/output module baffle comprises a fixing plate, a conductive component and a frame. The fixing plate includes a plurality of retaining clips to clamp the fixing plate on the connector module. The conductive component is located between the fixing plate and the connector module. The frame is located between the fixing plate and the casing.

According to another aspect of the disclosure, a motherboard is provided. The motherboard is adapted to an electronic device with a casing. The motherboard comprises a connector module and an input/output module baffle. The input/output module baffle comprises a fixing plate, a conductive component and a frame. The fixing plate includes a plurality of retaining clips to clamp the fixing plate on the connector module. The conductive component is located between the fixing plate and the connector module. The frame is located between the fixing plate and the casing.

An input/output module baffle and a motherboard are disclosed herein. The electrical connection between the motherboard and the casing is improved effectively via the fixing plate and the conductive component. Then, the performance of anti-electromagnetic interference (EMI) and anti-electrostatic discharge (ESD) of the electronic device are improved.

Additionally, the shockproof performance between the casing and the connector module caused by vibration of the electronic device is improved. As a result, the stability and reliability of the electronic device are improved. The input/output module baffle is pre-installed on the motherboard. Consequently, it does not need to assemble the input/output module baffle on the motherboard via the casing, and the risk of being scratched is avoided. Furthermore, the convenience and security for assembling the motherboard on the casing is increased.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

These and other features, aspects, and advantages of the present invention will become better understood with regard to the following description, appended claims, and accompanying drawings. However, the invention is not limited to the embodiments. The description of the operation of components is not used for limiting the execution sequence. Any equivalent device with the combination according to the disclosure of the invention is in the scope of the invention. The components shown in figures are not used for limit the size or the proportion. The same or similar number denotes the same or similar components.

"The first", "the second" and so on are not used to limit the order. They are only used to distinguish components or operations with same technical terms, but not used to limit the invention.

The terms "comprising", "including", "has" and "having" are open-ended.

Figure 1:
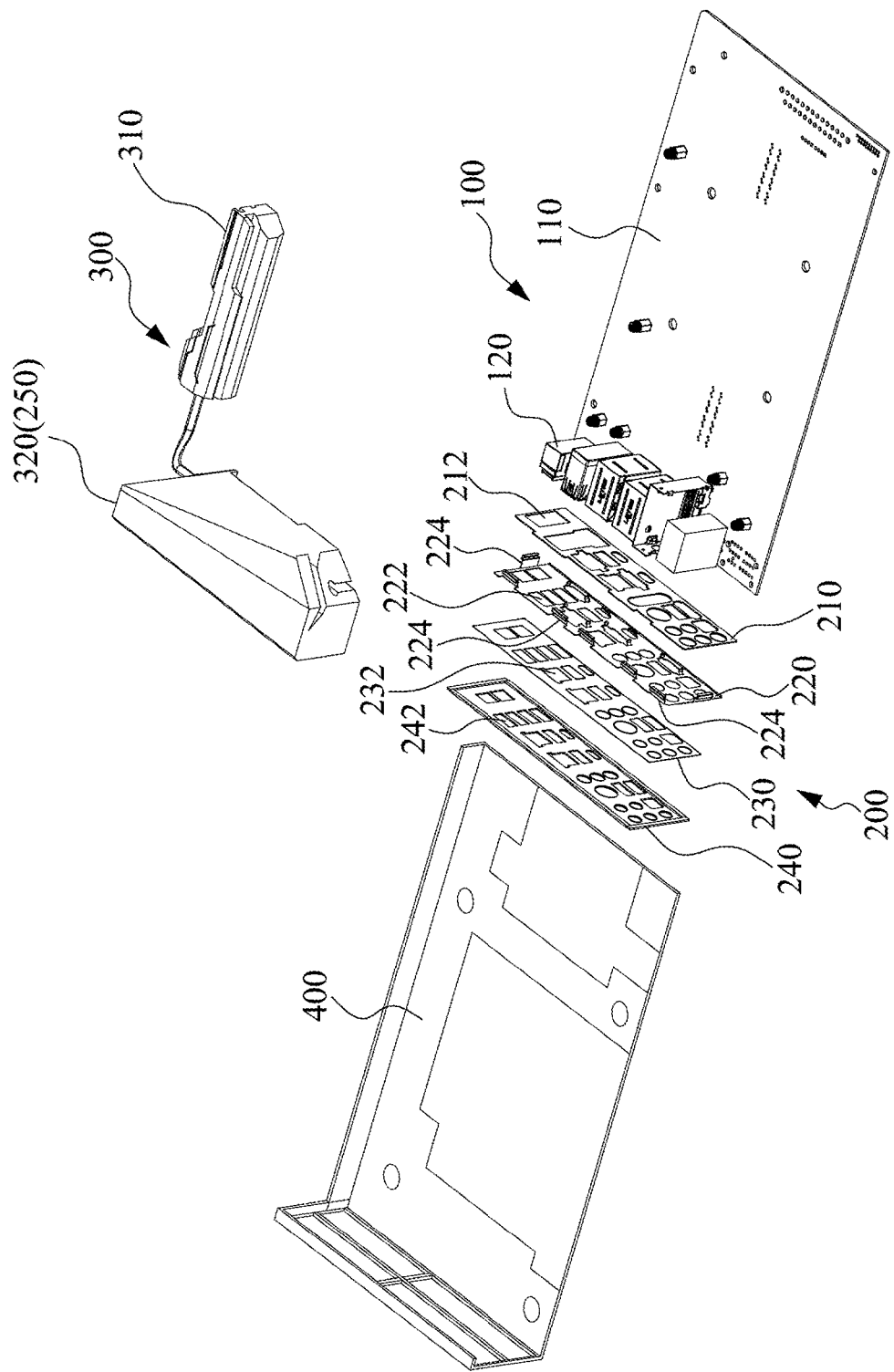
FIG. 1 is an exploded diagram showing a motherboard and a computer casing in an embodiment.
Figure 2:
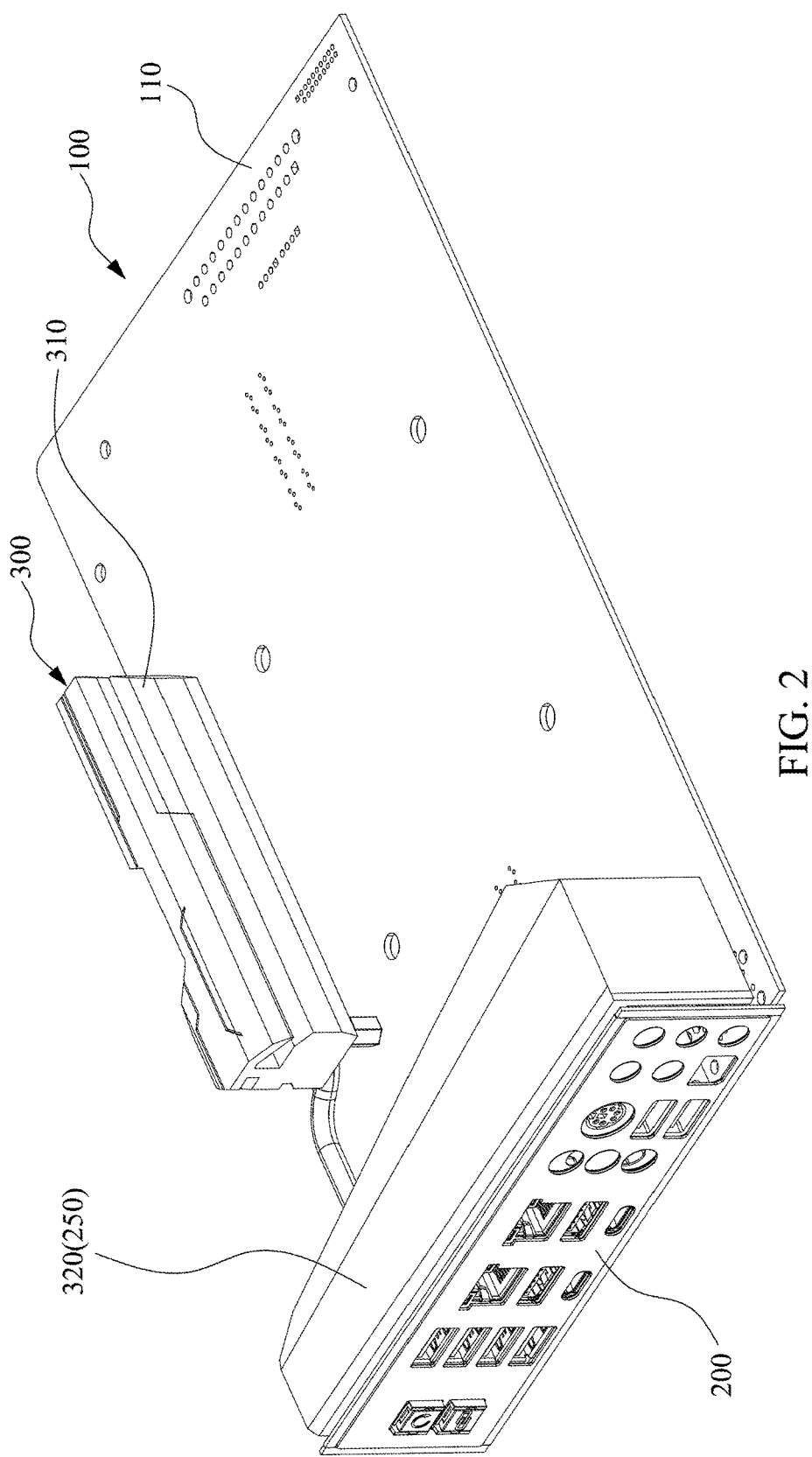
FIG. 2 is a schematic diagram showing an assembly of the motherboard in FIG. 1 in an embodiment.

FIG. 1 is an exploded diagram showing a motherboard and a computer casing in an embodiment. FIG. 2 is a schematic diagram showing an assembly of the motherboard in FIG. 1 in an embodiment.

Please refer to FIG. 1 and FIG. 2, in an embodiment, a motherboard 100 includes a circuit board 110. A connector module 120 is disposed on the circuit board 110. In an embodiment, the connector module 120 is disposed on a rear side of a casing 400 to facilitate connecting to a peripheral device.

In an embodiment, the motherboard 100 further includes an input/output module baffle 200 and a baffle fastener 250. The input/output module baffle 200 is assembled with the connector module 120. The input/output module baffle 200 is fixed on the circuit board 110 via the baffle fastener 250. In an embodiment, the baffle fastener 250 is a dust cover 320, such as a dust cover 320 with a heat dissipating module 300. Then, the input/output module baffle 200 is fixed on the circuit board 110 via the dust cover 320. In an embodiment, the heat dissipating module 300 further includes a heat sink 310 to dissipate heat from electronic components on the circuit board 110.

In an embodiment, the input/output module baffle 200 includes a fixing plate 220. A plurality of openings 222 and a plurality of retaining clips 224 are formed on the fixing plate 220. The fixing plate 220 is held on the connector module 120 of the circuit board 110 via the retaining clips 224. The openings 222 match with and expose connecting ports of the connector module 120.

In an embodiment, the input/output module baffle 200 further includes a conductive component 210 fixed on the fixing plate 220. The conductive component 210 is located between the fixing plate 220 and the connector module 120. A plurality of openings 212 are formed on the conductive component 210. The openings 212 match with and expose the connecting ports of the connector module 120.

In an embodiment, the conductive component 210 is conductive foam, conductive cloth or other soft conductive materials. The fixing plate 220 and a connector casing of the connector module 120 are electrically connected via the conductive component 210.

In an embodiment, the input/output module baffle 200 further includes a frame 240. The frame 240 includes at least one opening 242. The frame 240 is located at the other side of the fixing plate 220. That is, when the motherboard 100 is assembled on the computer casing 400, the frame 240 is located between the fixing plate 220 and the computer casing 400. The frame 240 is fixed on the fixing plate 220 to make the fixing plate 220, the frame 240 and the computer casing 400 electrically connected when in use.

As a result, an interference signal is isolated effectively. The performance of anti-electromagnetic interference (EMI) of the electronic device is improved. The connecting port on the connector module 120 is exposed via the opening 242. Moreover, the vibration caused by the electronic device when in use or in transport is reduced effectively via the soft conductive component 210. As a result, the durability and reliability of products are improved.

In an embodiment, the input/output module baffle 200 further includes a conductive sheet 230. The conductive sheet 230 is located between the fixing plate 220 and the frame 240 to make the fixing plate 220 adhered to the frame 240. Then, the fixing plate 220 and the frame 240 are electrically connected when in use. In an embodiment, the conductive sheet 230 includes at least one opening 232 to expose the connecting port on the connector module 120. In an embodiment, the conductive sheet 230 is a conductive double-sided foam tape or other conductive materials with an adhesive function, which is not limited herein.

The input/output module baffle 200 in the embodiment is adapted to an electronic device. The electronic device includes a motherboard 100 and a casing 400, such as a computer casing. The motherboard 100 is disposed inside the casing 400. The motherboard 100 includes a connector module 120. The input/output module baffle 200 makes the motherboard 100 and the casing 400 electrically connected via the input/output module baffle 200.

Then, the anti-electromagnetic interference and the shockproof performance of the electronic device are improved. In an embodiment, the fixing plate 220 and the frame 240 are made of a metal plate, a stainless steel plate or other conductive materials.

Figure 3:
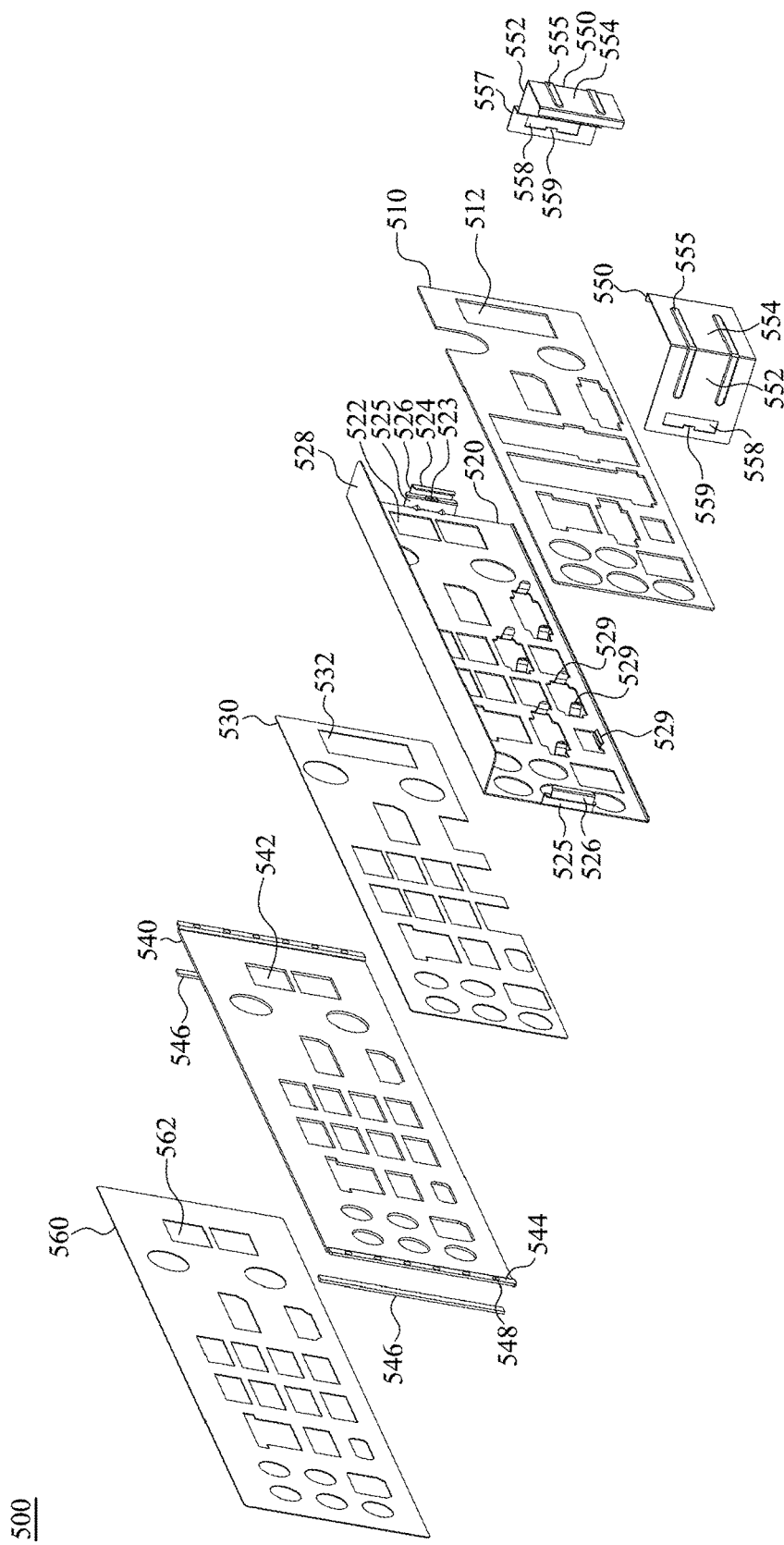
FIG. 3 is an exploded diagram showing an input/output module baffle in an embodiment.

FIG. 3 is an exploded diagram showing an input/output module baffle in an embodiment. As shown in FIG. 3, the input/output module baffle 500 includes a fixing plate 520. The fixing plate 520 includes a plurality of openings 522 and a plurality of retaining clips 524. The fixing plate 520 is held on the connector module of the circuit board via the retaining clips 524. The openings 522 match with and expose connecting ports of the connector module.

In an embodiment, the input/output module baffle 500 further includes a conductive component 510 fixed on the fixing plate 520. The conductive component 510 is located between the fixing plate 520 and the connector module. The conductive component 510 includes a plurality of openings 512. The openings 512 match with and expose the connecting ports on the connector module.

In an embodiment, the conductive component 510 is conductive foam, conductive cloth or other soft conductive materials. Then, the fixing plate 520 and a connector casing of the connector module are electrically connected when in use.

In an embodiment, the input/output module baffle 500 further includes a frame 540. The frame 540 is located at the other side of the fixing plate 520. When the motherboard is assembled on the computer casing, the frame 540 is located between the fixing plate 520 and the computer casing. The frame 540 is fixed on the fixing plate 520 to make the fixing plate 520, the frame 540 and the computer casing electrically connected when in use. As a result, an interference signal is grounded effectively. The performance of anti-electromagnetic interference (EMI) of the electronic device is improved.

Moreover, the vibration caused by the electronic device when in use or in transport is reduced effectively via the soft conductive component 510. As a result, the durability and reliability of products are improved.

In an embodiment, the input/output module baffle 500 further includes a conductive sheet 530. The conductive sheet 530 is located between the fixing plate 520 and the frame 540 to make the fixing plate 520 adhered to the frame 540. Then, the fixing plate 520 and the frame 540 are electrically connected with each other. In an embodiment, the conductive sheet 530 includes at least one opening 532 to expose part of the fixing plate 520. In an embodiment, the conductive sheet 530 is a conductive double-sided foam tape or other conductive materials with an adhesive function, which is not limited herein.

In an embodiment, the input/output module baffle 500 further includes a baffle fastener 550. In an embodiment, the baffle fastener 550 is an L-shaped baffle fastener to make the fixing plate 520 fastened with the connector module of the circuit board.

In an embodiment, the retaining clip 524 further includes a positioning opening 523. The baffle fastener 550 further includes a positioning portion 557, a connecting portion 552 and a fastening portion 554. The positioning portion 557 includes a positioning protrusion 559 formed in the opening 558. Then, the baffle fastener 550 is positioned in the positioning opening 523 of the retaining clip 524. In an embodiment, the baffle fastener 550 further includes a reinforcing rib 555 to enhance the strength of the baffle fastener 550.

In an embodiment, the retaining clip 524 further includes a clamping portion 525 and an extending portion 526. An inner surface of the clamping portion 525 is clamped on the casing of the connector module of the circuit board. The positioning opening 523 is formed between the clamping portion 525 and the extending portion 526. The strength of the retaining clip 524 is further enhanced via the extending portion 526.

In an embodiment, a clamping plate 528 is formed above the fixing plate 520. Cooperating with clamping elastic sheets 529 formed on two sides of the opening 522, the input/output module baffle 500 is fastened with the connector module of the circuit board.

The fastening portion 554 of the baffle fastener 550 is fastened with the back of the connector module 120. Then, the fixing plate 520 is steadily assembled on the connector module of the circuit board.

Moreover, the frame 540 further includes a plurality of openings 542 and an extension portion 544. The connecting ports of the connector module of the circuit board are exposed from the openings 542. A plurality of conductive bumps 548 are formed on the extension portion 544. An elastic conductive sheet 546 is adhered to the extension portion 544 to make the frame 540 and the computer casing electrically connected when in use.

In an embodiment, the elastic conductive sheet 546 is made of conductive foam or conductive cloth, which is not limited herein. In an embodiment, the elastic conductive sheet 546 is made of soft conductive material. Then, the frame 540 is steadily contacted with the casing when in use. Consequently, the conducting effect is improved. In an embodiment, the fixing plate 520, the frame 540 and the baffle fastener 550 are made of a metal plate, a stainless steel plate or other conductive materials.

Moreover, in an embodiment, the input/output module baffle 500 further includes an engraving plate 560. The engraving plate 560 includes a plurality of openings 562. The engraving plate 560 is configured at a side of the frame 540 far away from the connector module 120. A pattern corresponding to the connector is formed on an outer side surface of the engraving plate 560 to show the position of each connecting port of the connector module.

In sum, the electrical connection between the motherboard and the casing is enhanced via the input/output module baffle and the motherboard. Then, the performance of anti-electromagnetic interference and the shockproof performance of the electronic device are improved. As a result, the stability and reliability of the electronic device is improved. Since the input/output module baffle is assembled on the motherboard and then assembled on the casing, the risk of being scratched by the casing is avoided. The convenience and security for assembling the motherboard on the casing is increased.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. An input/output module baffle, adapted to an electronic device, the electronic device includes a motherboard and a casing, the motherboard is located inside the casing, the motherboard includes a connector module, the input/output module baffle comprising:

a fixing plate including a plurality of retaining clips to clamp the fixing plate on the connector module;

a conductive component located between the fixing plate and the connector module; and a frame located between the fixing plate and the casing, wherein the input/output module baffle further includes a baffle fastener to fasten the fixing plate on the connector module of the motherboard, the retaining clips further include a positioning opening, the baffle fastener further includes a positioning portion, and the positioning portion includes a positioning protrusion to position the baffle fastener in the positioning opening, wherein the baffle fastener further includes a connecting portion and a fastening portion, and the fastening portion is buckled on a back of the connector module.

2. The input/output module baffle according to claim 1, wherein the input/output module baffle further includes a conductive double-sided foam tape to make the fixing plate adhered to the frame.

3. The input/output module baffle according to claim 2, wherein the frame further includes an extension portion, a plurality of conductive bumps are formed on the extension portion, and an elastic conductive sheet is adhered to the extension portion.

4. The input/output module baffle according to claim 3, wherein the input/output module baffle further includes an engraving plate, and the engraving plate is configured at a front side surface of the frame.

5. A motherboard adapted to an electronic device, the electronic device includes a casing, the motherboard comprising:

a connector module; and an input/output module baffle, wherein the input/output module baffle comprising:

a fixing plate including a plurality of retaining clips to clamp the fixing plate on the connector module;

a conductive component located between the fixing plate and the connector module; and a frame located between the fixing plate and the casing, wherein the motherboard further includes a baffle fastener, the baffle fastener is configured to fasten the fixing plate on the connector module of the motherboard, and the retaining clips further include a positioning opening, the baffle fastener further includes a positioning portion, a connecting portion and a fastening portion, the positioning portion includes a positioning protrusion to position the baffle fastener in the positioning opening, and the fastening portion is buckled on a back of the connector module.

6. The motherboard according to claim 5, wherein the frame further includes an extension portion, a plurality of conductive bumps are formed on the extension portion, and an elastic conductive sheet is adhered to the extension portion.

* * * * *